United States Patent
Biehler et al.

(10) Patent No.: US 9,342,296 B2
(45) Date of Patent: *May 17, 2016

(54) NAVIGATION BETWEEN APPLICATION LOCATIONS OF RESOURCES IN AUTOMATION SYSTEMS

(75) Inventors: Georg Biehler, Nürnberg (DE); Wolfgang Füßlein, Essingen (DE); Lothar Trapp, Feucht (DE)

(73) Assignee: SIEMENS AKTIENGESELLCHAFT, München (DE)

( * ) Notice: Subject to any disclaimer, the term of this patent is extended or adjusted under 35 U.S.C. 154(b) by 2729 days.

This patent is subject to a terminal disclaimer.

(21) Appl. No.: 11/811,942

(22) Filed: Jun. 12, 2007

(65) Prior Publication Data

US 2007/0288099 A1 Dec. 13, 2007

(30) Foreign Application Priority Data

Jun. 12, 2006 (EP) ..................................... 06012060

(51) Int. Cl.

| | |
|---|---|
| *G05B 19/00* | (2006.01) |
| *G05B 19/418* | (2006.01) |
| *G06F 15/16* | (2006.01) |
| *G06F 17/30* | (2006.01) |
| *G06F 9/44* | (2006.01) |

(52) U.S. Cl.
CPC *G06F 8/70* (2013.01); *G05B 19/00* (2013.01); *G05B 19/418* (2013.01); *G06F 15/16* (2013.01); *G06F 17/30* (2013.01)

(58) Field of Classification Search
CPC ...... G05B 19/418; G05B 19/00; G06F 15/16; G06F 17/30
See application file for complete search history.

(56) References Cited

U.S. PATENT DOCUMENTS

| | | | |
|---|---|---|---|
| 4,855,906 A | * | 8/1989 | Burke |
| 5,887,173 A | | 3/1999 | Ogawa et al. |
| 6,064,814 A | * | 5/2000 | Capriles et al. ............... 717/116 |

(Continued)

*Primary Examiner* — Patrice Winder
*Assistant Examiner* — Angela Widhalm De Rodrig

(57) ABSTRACT

There is described a method and a system allowing the use of at least one resource of a first automation system in at least one second automation system, whereby the resource is made available by the first automation system and an identification characteristic is used for the unique identification of the resource in the at least second automation system. A user is enabled to navigate in a simple manner between the application locations of originator and user of a resource. This is achieved by the fact that the use of the resource of the first automation system in the at least second automation system is mapped as a bilateral reference in each case between the automation systems and is stored in each case in a storage area in the automation systems, whereby the bilateral reference also contains application locations of the resource in the respective automation system. By using this method or system, a rapid identification of the communication partners involved with a resource can be displayed and the declaration location or the application location of this resource can be displayed there. This method is particularly suitable for supporting the navigation between a variable made available and its application locations and the corresponding instances in the case of bilateral programmed function block communication. With regard to unilateral programmed function block communication, it is possible to navigate between the variable reference specified at the block and the actual variable. This navigation is effected with system support and always finds all the application locations. A major source of error is thereby avoided.

12 Claims, 1 Drawing Sheet

(56) References Cited

U.S. PATENT DOCUMENTS

| | | | |
|---|---|---|---|
| 6,119,125 A * | 9/2000 | Gloudeman et al. | |
| 6,154,787 A * | 11/2000 | Urevig et al. | 710/8 |
| 6,205,576 B1 * | 3/2001 | Rajala et al. | 717/105 |
| 6,240,326 B1 * | 5/2001 | Gloudeman | G05B 19/0426 700/275 |
| 6,668,205 B1 * | 12/2003 | Ueno | G05B 19/418 700/104 |
| 6,671,686 B2 * | 12/2003 | Pardon et al. | 707/8 |
| 6,751,653 B2 * | 6/2004 | Austin | 709/217 |
| 6,971,065 B2 * | 11/2005 | Austin | 715/763 |
| 6,980,080 B2 * | 12/2005 | Christensen et al. | 340/3.5 |
| 7,330,473 B1 * | 2/2008 | Baier et al. | 370/401 |
| 7,437,203 B2 * | 10/2008 | O'Donnell | G06F 11/00 700/2 |
| 7,822,802 B2 * | 10/2010 | Chen et al. | 709/201 |
| 2002/0095521 A1 * | 7/2002 | Blaukopf et al. | 709/310 |
| 2002/0184348 A1 * | 12/2002 | Rapp | G05B 19/0421 709/220 |
| 2003/0149608 A1 * | 8/2003 | Kall | G06Q 10/06 705/7.27 |
| 2004/0015543 A1 * | 1/2004 | Schmidt et al. | 709/203 |
| 2005/0144154 A1 * | 6/2005 | DeMesa | G06F 17/30964 |
| 2006/0064673 A1 * | 3/2006 | Rogers et al. | 717/113 |
| 2006/0074498 A1 * | 4/2006 | Kalan et al. | 700/19 |
| 2006/0117295 A1 * | 6/2006 | Wu et al. | 717/104 |
| 2007/0073426 A1 * | 3/2007 | Chand | G05B 19/0426 700/87 |
| 2007/0078980 A1 * | 4/2007 | Tomita | G05B 19/042 709/225 |
| 2007/0198736 A1 * | 8/2007 | Biehler et al. | 709/230 |
| 2007/0282781 A1 * | 12/2007 | Mathiesen | G06Q 10/06 |

* cited by examiner

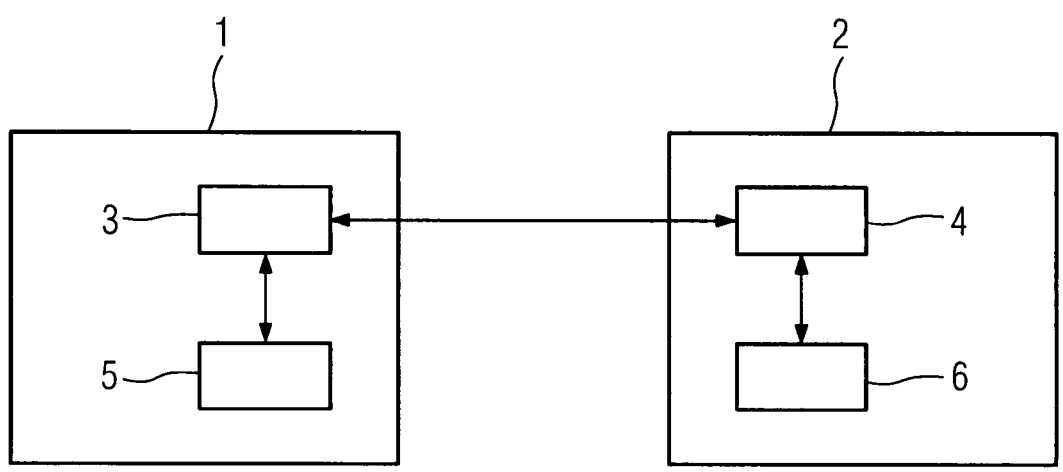

NAVIGATION BETWEEN APPLICATION LOCATIONS OF RESOURCES IN AUTOMATION SYSTEMS

CROSS REFERENCE TO RELATED APPLICATIONS

This application claims priority of European application No. 06012060.7 EP filed Jun. 12, 2006, which is incorporated by reference herein in its entirety.

FIELD OF INVENTION

The invention relates to a method and a system allowing the use of at least one resource of a first automation system in at least one second automation system, whereby the resource is made available by the first automation system and an identification characteristic is used for the unique identification of the resource in the at least second automation system.

BACKGROUND OF INVENTION

A method or system of such a type is employed in the field of plant automation, in which a plurality of automation systems is generally employed for controlling or updating a plant. In this situation, an important partial aspect is the use of variables from one automation system in a different automation system. The program elements that make mutual use of common resources, such as variables for example, have a logical relationship through this shared usage. For this reason, changes in one location frequently also necessitate changes in other locations, for example if the meaning of a variable or the data type of a variable changes. In many cases the user must be able to modify the program locations of the originator and the user of a resource. To this end, he must be able to easily select these program locations, starting from one side, for example in order to be able to find, open, display and change the program locations in question. Since a resource can be used by a plurality of users, it is also necessary to exercise control over a plurality of users. This required functionality corresponds to a type of "cross-reference list" for the global use of resources across the automation system, allowing the relevant program elements to be called and/or displayed. In this situation, the resources are generally displayed, and any changes needed made, in an engineering system linked communicatively with the automation systems.

According to the prior art, the instances of use of variables can only be displayed in the context of a program of an automation system by way of the reference list and navigation is effected by way of the latter to the corresponding definition location and all application locations. There are no corresponding solutions relating to the use of a resource in a plurality of automation systems.

When using unilateral programmed function block communication, for example with PUT/GET or READ/WRITE in accordance with IEC 61131-5, the user must ascertain the communication partner from the properties of the connection for example. Here he must use the address or name to identify the local variable in the program here and can use the local reference list here to find the application locations. When using bilateral programmed function block communication, for example with USEND/URCV, the user must similarly first ascertain the communication partner from the properties of the connection for example. Here he must use the connection identifier here belonging to the connection and the parameter R_ID to find the corresponding instance. The local variable used is here, and he can use the local reference list here to find the application locations.

SUMMARY OF INVENTION

An object of the invention is to enable simple navigation between the application locations of a resource in different automation systems.

This object is achieved with regard to a method and a system of the type mentioned in the introduction by the fact that the use of the resource of the first automation system in the at least second automation system is mapped as a bilateral reference in each case between the automation systems, whereby the bilateral reference also contains application locations of the resource in the respective automation system.

The mapping of the use of a resource in an object of a different communication partner, in other words a different automation system, as a bilateral reference between these objects is effected with system support and therefore always finds all application locations. A major source of error is thereby avoided.

In an advantageous embodiment, the identification characteristic is constructed hierarchically and has a system-specific path and a local identification of the resource. In this situation, the system-specific path is for example a path name, and the local identification is for example a name of the resource.

In a further advantageous embodiment, the bilateral reference in each case is stored in the at least two automation systems in a storage area in each case and is thus available locally in the systems.

In a further advantageous embodiment, the bilateral reference in each case is stored on an engineering system in a storage area. The bilateral reference is thus available directly in the engineering system, by way of which generally the display is effected and any changes relating to the resources are made, and which is linked communicatively with the automation systems.

In a further advantageous form of the embodiment, the application locations of the at least one resource of the first automation system can be displayed both in the first and also in the at least second automation system by way of the bilateral reference in each case by means of a first tool. The overview of the effect of the individual interacting program elements is facilitated and enhanced by this method since the originator/user relationship is represented and origination and use can be simply displayed in their respective context.

In a further advantageous form of the embodiment, the application locations of the at least one resource can be opened by means of the first tool in a second tool. This method is particularly suitable for navigation between a variable made available by one automation system and the variable's application locations and the corresponding instances in other automation systems in the case of bilateral programmed function block communication. With regard to unilateral programmed function block communication, it is possible to navigate between the variable reference specified at the block and the actual variable.

In a further advantageous form of the embodiment, the type of the second tool is determined by the application location. This serves to ensure that the object in question is opened with the tool appropriate to this object, for example the appropriate programming language editor.

In a further advantageous form of the embodiment, the second tool is integrated into the first tool. From these properties and the aforementioned advantages there results a considerable reduction in complexity for the user, as well as major assistance during program testing and commissioning, which results in clear time and cost savings.

In a further advantageous form of the embodiment, the first and the second tool are supported by means of an engineering system which is linked communicatively with the automation systems. In this situation, if the second tool is integrated into the first tool, this can for example be implemented by means of a further window in the engineering system.

BRIEF DESCRIPTION OF THE DRAWING

The invention will be described and explained in detail in the following with reference to the embodiment illustrated in FIGURE. In the drawing:

FIG. 1 shows a schematic illustration of two automation systems which both use the same variable.

DETAILED DESCRIPTION OF INVENTION

The FIGURE shows a first automation system 1 in which a variable 3 is defined. This variable 3 is used in a second automation system 2, for which a proxy variable 4 is set up in order to avoid the need for the second automation system 2 to access the remote, first automation system 1 for each occasion the variable 3 is used. The use of the variable 3 in the second automation system 2 is mapped with its precise application location as a bilateral reference. This bilateral reference is stored in a storage area 5, 6 both in the first and also in the second automation system 1, 2. The application locations both of the variable 3 and also of its counterpart, the proxy variable 4, in the second automation system 2 can thus be displayed in both automation systems 1, 2. In this situation, the variables 3, 4 can also be displayed, and any changes needed made, in an engineering system linked communicatively with both automation systems 1, 2, in which the storage of the bilateral reference can additionally (or also exclusively in an embodiment not corresponding to the FIGURE) take place.

To summarize: The invention relates to a method and a system allowing the use of at least one resource of a first automation system in at least one second automation system, whereby the resource is made available by the first automation system and an identification characteristic is used for the unique identification of the resource in the at least second automation system.

The object of the invention is to enable a user to navigate in a simple manner between the application locations of originator and user of a resource. This object is essentially achieved by the fact that the use of the resource of the first automation system in the at least second automation system is mapped as a bilateral reference in each case between the automation systems and is stored in each case in a storage area in the automation systems, whereby the bilateral reference also contains application locations of the resource in the respective automation system. By using this method or system, a rapid identification of the communication partners involved with a resource can be displayed and the declaration location or the application location of this resource can be displayed there. This method is particularly suitable for supporting the navigation between a variable made available and its application locations and the corresponding instances in the case of bilateral programmed function block communication. With regard to unilateral programmed function block communication, it is possible to navigate between the variable reference specified at the block and the actual variable.

This navigation is effected with system support and always finds all the application locations. A major source of error is thereby avoided.

The invention claimed is:

1. A method for using at least one resource of a first automation system in at least a second automation system, comprising:
    employing the first and second automation system for controlling or updating a plant;
    providing the at least one resource by the first automation system;
    using the at least one resource in the second automation system;
    using an identification characteristic for a unique identification of the resource at least in the second automation system; and
    providing a bilateral reference mapping between the first automation systems and the second automation system, wherein as associated bilateral reference contains application locations of the at least one resource in the first automation system and the second automation system;
    indicating the use of the resource of the first automation system in the at least second automation system based upon a bilateral reference wherein the first automation system has a first storage area and the second automation system has a second storage area, the method including the step of storing the bilateral reference in the first storage area and in the second storage area.

2. The method as claimed in claim 1, wherein the identification characteristic is constructed hierarchically, and wherein the identification characteristic has a system-specific path and a local identification of the resource.

3. The method as claimed in claim 1, wherein the bilateral reference is stored on an engineering system.

4. The method as claimed in claim 2, wherein the bilateral reference is stored on an engineering system.

5. The method as claimed in claim 1, wherein application locations of the at least one resource of the first automation system is displayed via the first automation system and in the second automation system based upon the bilateral reference.

6. The method as claimed in claim 2, wherein application locations of the at least one resource of the first automation system is displayed in the first automation system and in the second automation system by way of the bilateral reference in each case by means of a first tool.

7. The method as claimed in claim 1, wherein application locations of the at least one resource of the first automation system is displayed in the first automation system and in the second automation system by way of the bilateral reference in each case by means of a first tool.

8. The method as claimed in claim 1, wherein application locations of the at least one resource of the first automation system is displayed in the first automation system and in the second automation system by way of the bilateral reference in each case by means of a first tool which is a programming language editor.

9. The method as claimed in claim 5, wherein the application locations of the at least one resource is opened by means of a first tool in a second tool one or more of which may be a programming language editor.

10. The method as claimed in claim 9, wherein a type of the second tool is determined by the application locations.

11. The method as claimed in claim 9, wherein the second tool is integrated in the first tool.

12. The method as claimed in claim 9, wherein the first tool and the second tool are supported by means of an engineering system which is linked communicatively with the first and second automation systems.

* * * * *